(12) United States Patent
Asaka et al.

(10) Patent No.: US 10,736,261 B2
(45) Date of Patent: Aug. 11, 2020

(54) WORK VEHICLE

(71) Applicant: KOMATSU LTD., Tokyo (JP)

(72) Inventors: Hirokazu Asaka, Tokyo (JP); Yudai Furudate, Tokyo (JP)

(73) Assignee: KOMATSU LTD., Tokyo (JP)

( * ) Notice: Subject to any disclaimer, the term of this patent is extended or adjusted under 35 U.S.C. 154(b) by 161 days.

(21) Appl. No.: 16/044,720

(22) Filed: Jul. 25, 2018

(65) Prior Publication Data

US 2019/0029168 A1    Jan. 31, 2019

(30) Foreign Application Priority Data

Jul. 28, 2017  (JP) ................................ 2017-146820

(51) Int. Cl.
    *A01C 11/02*      (2006.01)
    *A01C 11/00*      (2006.01)
    *A01C 23/00*      (2006.01)

(52) U.S. Cl.
    CPC ............ *A01C 11/02* (2013.01); *A01C 11/006* (2013.01); *A01C 23/007* (2013.01); *A01C 23/008* (2013.01)

(58) Field of Classification Search
    CPC ....... A01C 11/02; A01C 11/00; A01C 11/006; A01C 23/007; A01C 23/00; A01C 23/008
    See application file for complete search history.

(56) References Cited

U.S. PATENT DOCUMENTS

| | | | |
|---|---|---|---|
| 4,111,135 A | 9/1978 | Braun et al. | |
| 5,159,887 A | 11/1992 | Poll | |
| 5,213,981 A * | 5/1993 | Sei ......................... | C12M 29/04 435/286.4 |
| 2004/0244660 A1 | 12/2004 | Gabriel | |
| 2013/0105182 A1 * | 5/2013 | McLoughlin ............ | G05D 9/12 169/46 |

* cited by examiner

*Primary Examiner* — Christopher J. Novosad
(74) *Attorney, Agent, or Firm* — Global IP Counselors, LLP

(57) ABSTRACT

The tree planting machine includes a vehicle main unit, a washing water tank, a planting device, a washing water circuit, and a controller. The washing water tank is attached to the vehicle main body and holds water. The planting device is disposed on the vehicle main unit. The washing water circuit connects the washing water tank and the planting devices. The controller controls the washing water circuit so as to supply the water from the washing water tank to the planting devices.

7 Claims, 4 Drawing Sheets

ID WORK VEHICLE

CROSS-REFERENCE TO RELATED APPLICATIONS

This application claims priority under 35 U.S.C. § 119 to Japanese Patent Application No. 2017-146820 filed on Jul. 28, 2017. The entire disclosure of Japanese Patent Application JP 2017-146820 is hereby incorporated herein by reference.

BACKGROUND

Technical Field

The present invention relates to a work vehicle.

Description of the Related Art

In forestation work, seedlings are planted in the ground, and in recent years there have been proposals for mechanizing this work (see, for example, U.S. Patent Application Publication No. 2004-0244660).

U.S. Patent Application Publication No. 2004-0244660 discloses a configuration in which a plurality of planting devices is provided to a tractor. When a worker inserts seedlings or the like into the guide of a planting device, the seedlings are temporarily supported by a lever, after which the lever is rotated to drop the seedlings to a position that is a certain distance away from the last planted position. In this way, seedlings are automatically planted at a specific spacing.

SUMMARY

When planting seedlings automatically as described above, soil and the like adheres to them, making it necessary to periodically wash the planting devices, and irrigation also needs to be done when the seedlings are planted. However, washing the planting devices and irrigation requires a worker to manually supply water that is carried separately. It is an object of the present invention is to provide a work vehicle with which water used for tree planting can be supplied automatically.

The work vehicle according to the first aspect comprises a vehicle main unit, a first tank, a planting device, a first water circuit, and a controller. The first tank is attached to the vehicle main unit and is configured to hold water. The planting device is disposed on the vehicle main unit. The first water circuit connects the first tank and the planting devices. The controller is configured to control the first water circuit to supply water from the first tank to the planting device.

The present invention provides a work vehicle with which water used for tree planting can be supplied automatically.

DETAILED DESCRIPTION OF THE EMBODIMENT(S)

A tree planting machine that is an example of the work vehicle of the present invention will now be described through reference to the drawings. In the following description, the terms "upper," "lower," "front," "rear," "left," and "right" are in reference to the operator seated in the driver's seat.

Figure 1:
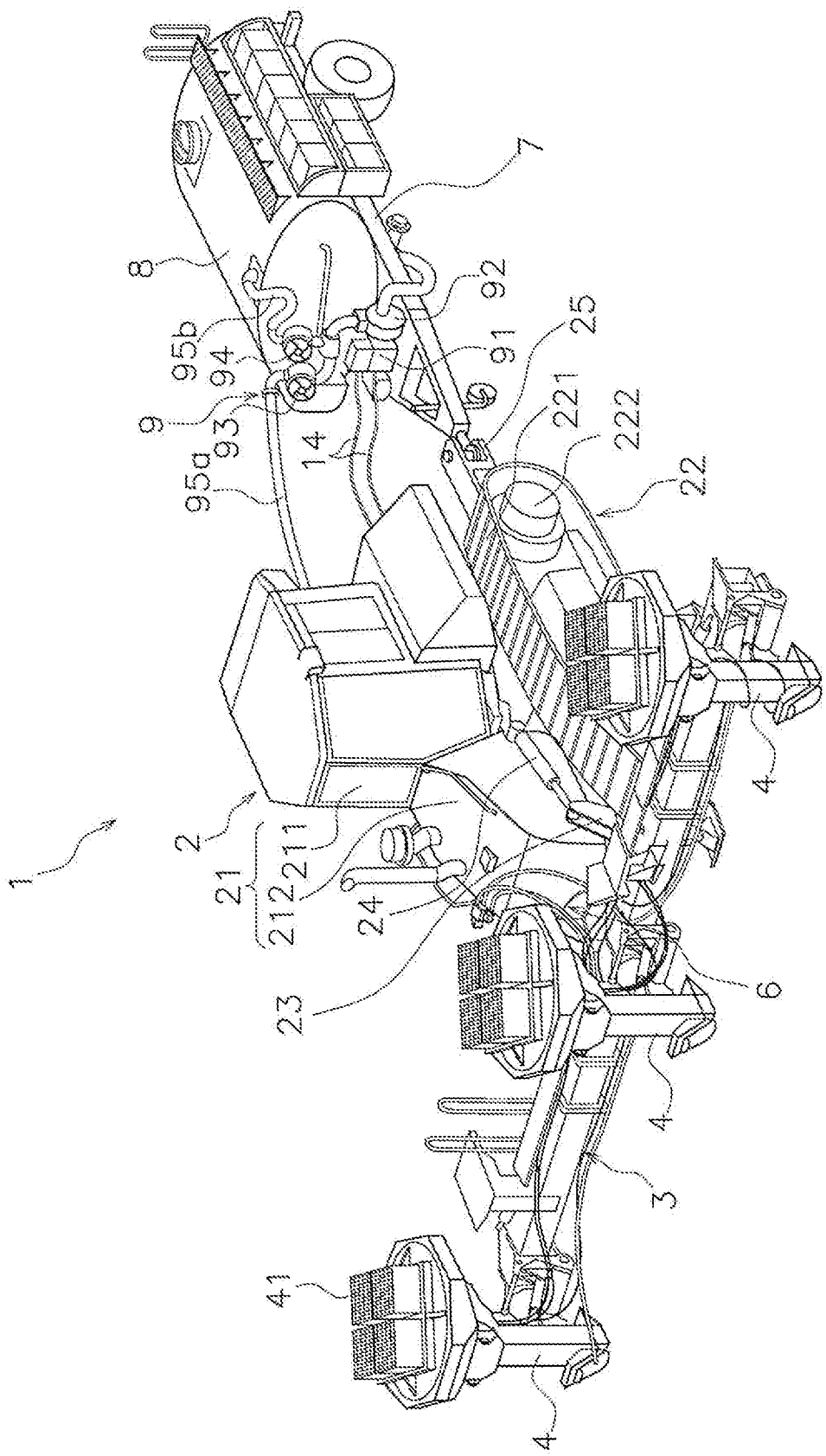
FIG. 1 is an oblique view of a tree planting machine in an embodiment of the present invention.
Figure 2:
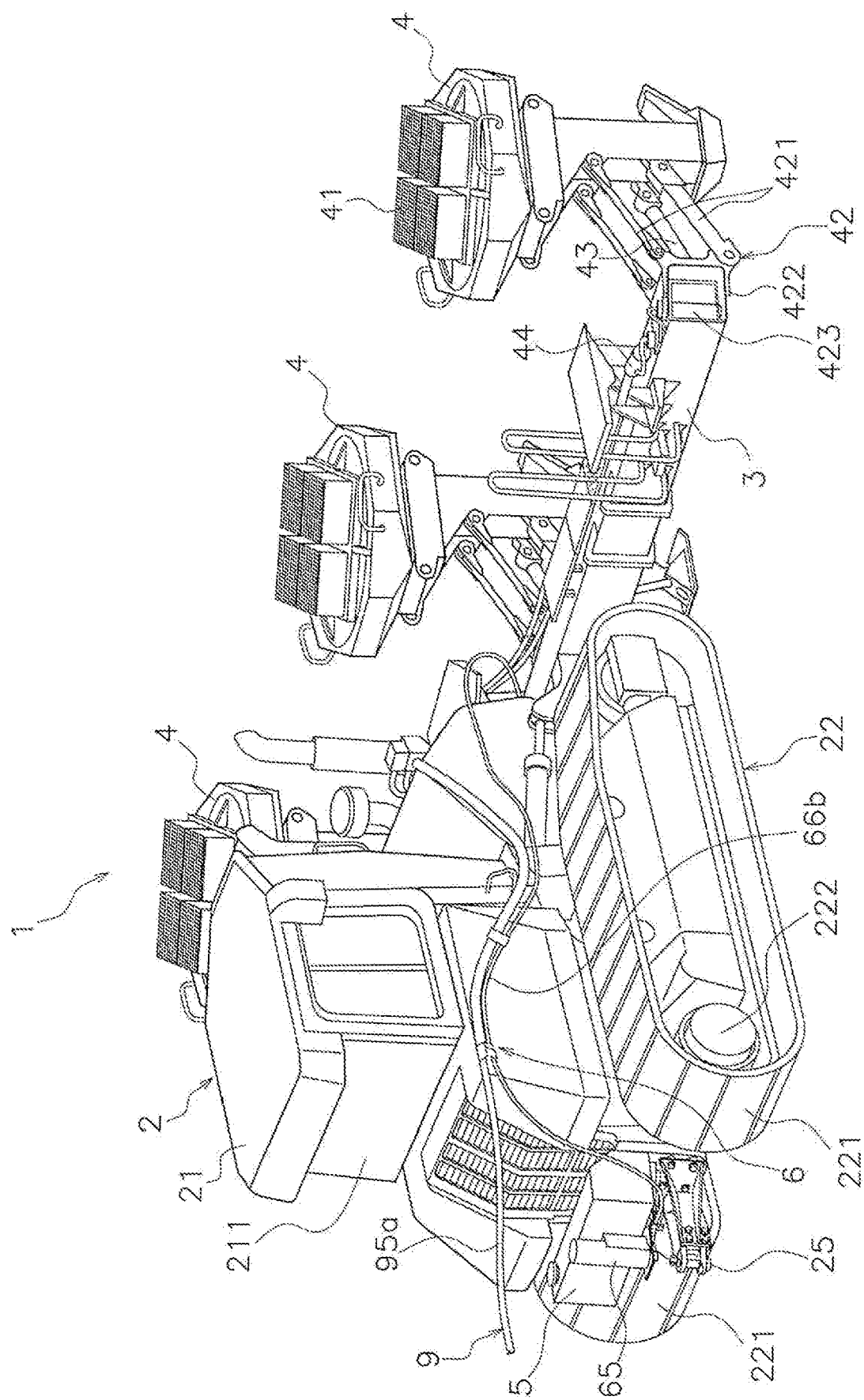
FIG. 2 is an oblique view from the right-rear side of the vehicle main unit in FIG. 1.

FIG. 1 is a simplified diagram of the configuration of a tree planting machine 1 in an embodiment of the present invention. FIG. 2 is an oblique view of the tree planting machine 1 as viewed from the rear.

Figure 4:
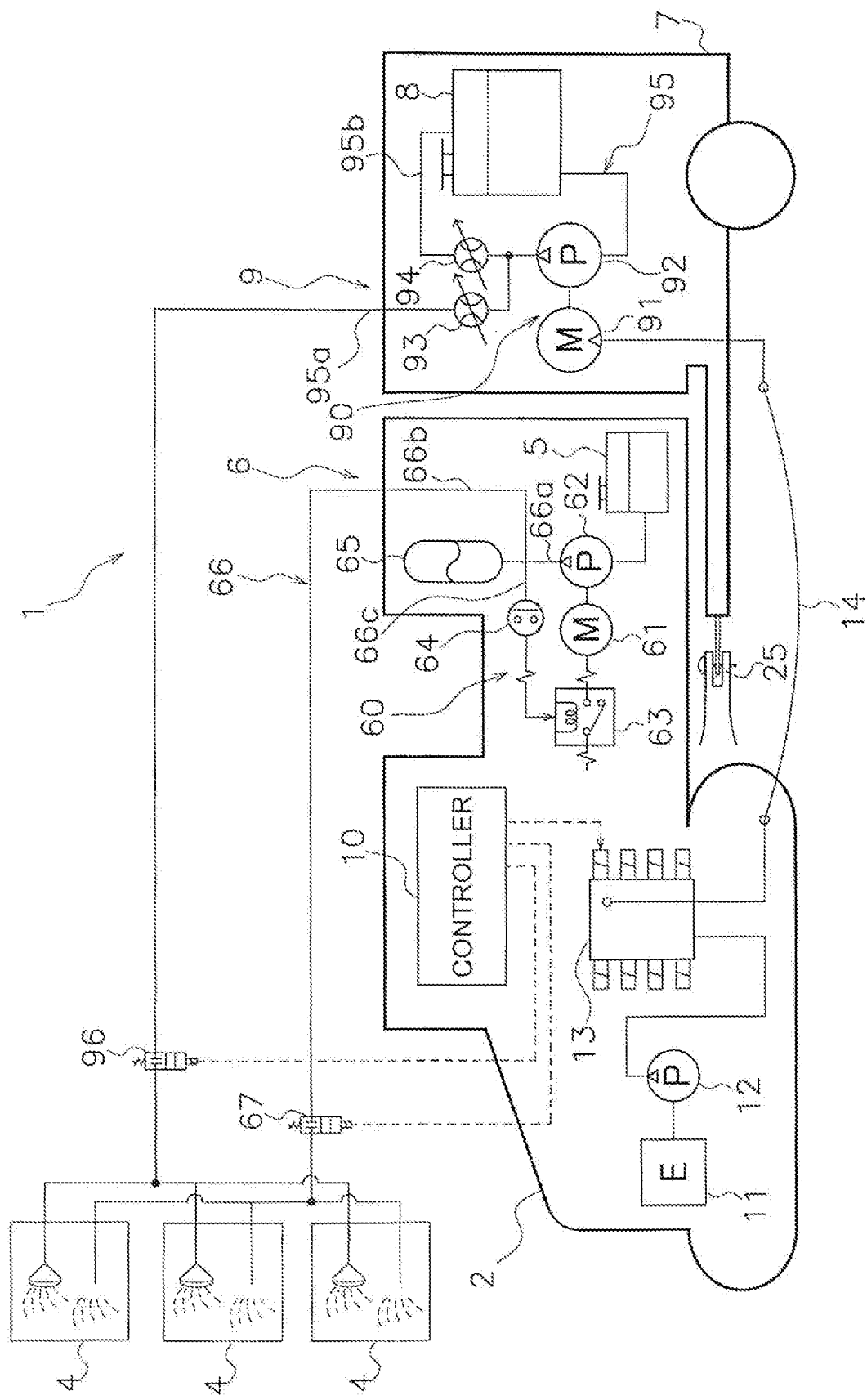
FIG. 4 is a diagram of the configuration for controlling washing water and irrigation water in the planting machine in FIG. 1.

The tree planting machine 1 is a device for planting seedlings, and comprises a vehicle main unit 2, a beam 3, a plurality of planting devices 4, a washing water tank 5 (see FIG/ 2), a washing water circuit 6, a trailer 7, an irrigation water lank 8 (not shown in FIG. 2), an irrigation water circuit 9, and a controller 10 (see FIG. 4).

The vehicle main unit 2 is a vehicle that can travel. The beam 3 is disposed at the front of the vehicle main unit 2 along the vehicle width direction (left and right direction), and is fixed to the vehicle main unit 2. The planting devices 4 are fixed to the beam 3. The washing water tank 5 is fixed to the rear of the vehicle main unit 2 as shown in FIG. 2. The trailer 7 is towed by the vehicle main unit 2. The irrigation water tank 8 is disposed on the trailer 7. The washing water circuit 6 connects the planting devices 4 and the washing water tank 5, and supplies washing water from the washing water tank 5 to the planting devices 4. The irrigation water circuit 9 connects the planting devices 4 to the irrigation water tank 8, and supplies irrigation water from the irrigation water tank 8 to the planting devices 4.

The controller 10 controls the washing water circuit 6, the irrigation water circuit 9, etc.

The vehicle main unit 2 comprises a body 21, a traveling apparatus 22, lift frames 23, and lift hydraulic cylinders 24.

The body 21 has a cab 211 and art engine compartment 212. A driver's seat is disposed in the cab 211. An engine 11 (see FIG. 4), a hydraulic pump 12 (see FIG. 4), and the like are disposed in the engine compartment 212.

The traveling apparatus 22 is attached below the body 21, and has a pair of crawler belts 221 (only the left side is shown in FIG. 1), a sprocket 222, an idler, and so forth. The crawler belts 221 rotate according to the drive of the sprocket 222, causing the vehicle main unit 2 to travel.

The lift frames 23 are provided as a pair on the left and right sides, and are disposed to the inside of the traveling apparatus 22 in the vehicle width direction (left and right direction). The lift frames 23 are attached to the body 21 so as to be able to pivot up and down around an axis that is parallel to the vehicle width direction. The beam 3 is fixed to the distal ends of lift frames 23.

The lift hydraulic cylinders 24 are linked to the body 21 and the central upper part of the lift frames 23. As the lift hydraulic cylinders 24 expand and contract, the lift frames 23 pivot up and down, and the beam 3 also pivots.

Three planting devices 4 are provided to the tree planting machine 1 in this embodiment. The beam 3 is attached to the vehicle main unit 2. The beam 3 is disposed on the front side of the vehicle main unit 2. The three planting devices 4 are attached to the beam 3. The beam 3 has a long rectangular shape and is disposed on the front side of the vehicle main unit 2 so that its lengthwise direction runs along the vehicle width direction (left and right direction). The length of the beam 3 in the vehicle width direction is set to be greater than the vehicle width of the vehicle main unit 2. That is, the beam 3 protrudes to the right and left sides of the vehicle main unit 2.

The three planting devices 4 are attached to the center, the right end, and the left end of the beam 3.

The planting devices 4 and the beam 3 are linked by links 42. As shown in FIG. 2, the links 42 each have a parallel link 421, an attachment component 422, and a pin 423. The pin 423 passes through the beam 3 in the vertical direction. The attachment component 422 is a substantially U-shaped member that is disposed so as to cover the front, upper, and lower sides of the beam 3, and is fixed to the portion of the pin 423 that is above the beam 3, and to the portion of the pin 423 that is below the beam 3. The attachment component 422 is configured to be able to pivot left and right with respect to the beam 3 around the vertically disposed pin 423.

The parallel link 421 links the planting device 4 and the attachment component 422. The parallel link 421 is able to pivot up and down with the planting device 4 and the attachment component 422. A vertically pivoting cylinder 43 that is expanded and contracted by hydraulic pressure is linked to the planting device 4 and the attachment component 422. The vertically pivoting cylinder 43 is disposed to the inside of the parallel link 421 in the vertical direction. The expansion and contraction of the vertically pivoting cylinder 43 causes the end of the parallel link 421 on the planting device 4 side to pivot up and down around the end on the beam 3 side. This moves the planting device 4 up and down.

A horizontally pivoting cylinder 44 for pivoting the planting device 4 to the left and right is linked to the beam 3 and the attachment component 422. The horizontally pivoting cylinder 44 is disposed substantially along the lengthwise direction of the beam 3, and is expanded and contracted by hydraulic pressure. Since the attachment component 422 pivots left and right with respect to the beam 3 along with the expansion and contraction of the horizontally pivoting cylinder 44, the position of the planting device 4 in the left and right direction can be adjusted in this way.

A plant tray 41 can be placed on the upper face of each planting device 4. A plant tray 41 is partitioned into a plurality of spaces, and a seedling is placed in each of the partitioned spaces. A pipe-shaped member whose lower end is formed in a beak shape is provided on the inside of the planting device 4, and a hole is made in the ground by this pipe-like member. The seedling held in the plant tray 41 then drops through the pipe-shaped member, and the beaked portion is opened up to place the seedling in the hole.

Figure 3:
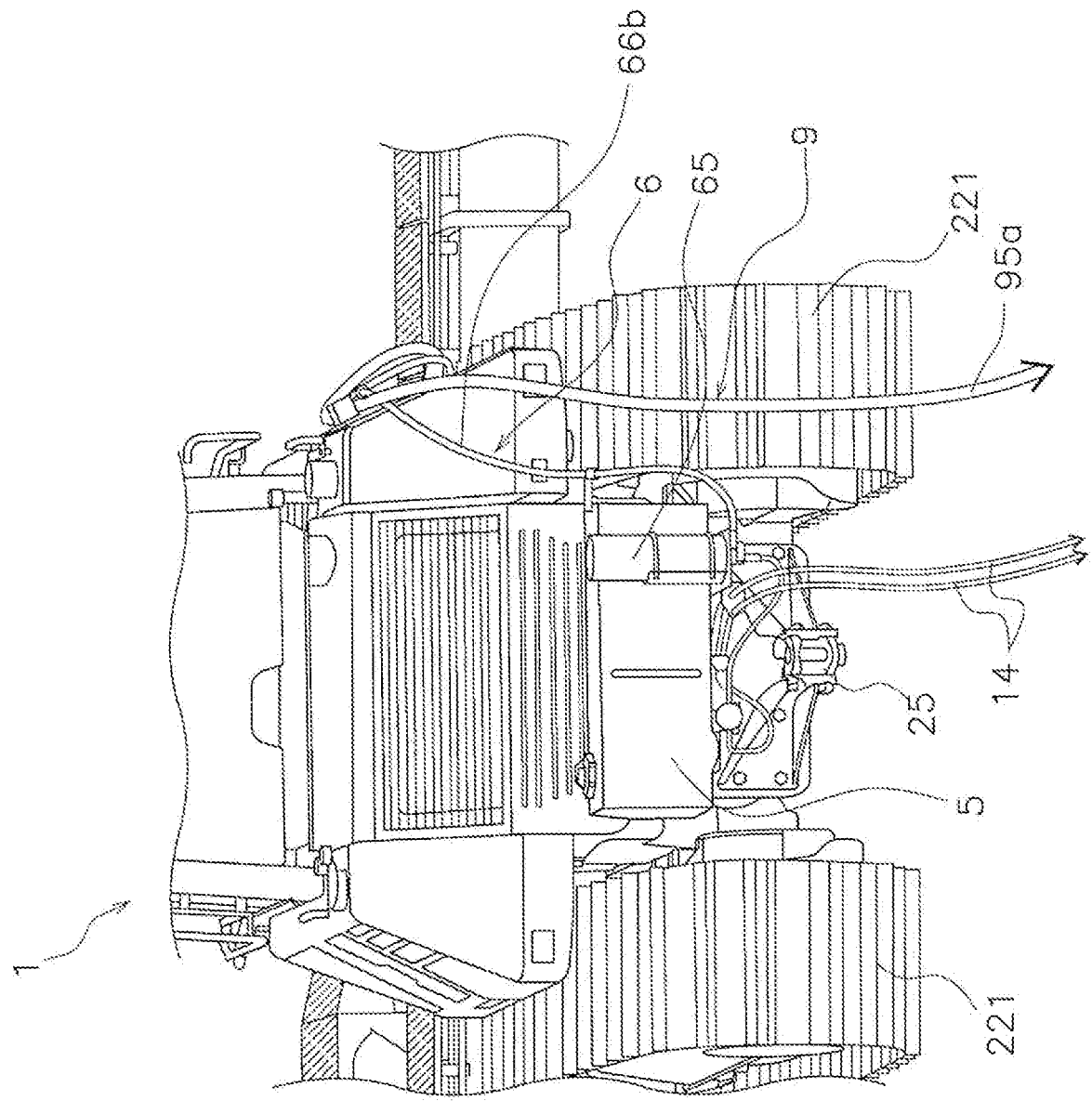
FIG. 3 is an oblique view from the rear of the vehicle main unit in FIG. 1.

FIG. 3 is an oblique view from the rear of the vehicle main unit 2. As shown in FIGS. 2 and 3, the washing water tank 5 is attached to the rear of the vehicle main unit 2. The water from the washing water tank 5 is supplied to the three planting devices 4 via the washing water circuit 6. The washing water is water from which dirt and the like have been removed so as to clean the pipe-shaped members, etc., inside the planting devices 4.

FIG. 4 is a diagram of the configuration for controlling the washing water circuit 6 and the irrigation water circuit 9 of the tree planting machine 1. As shown in FIG. 4, the washing water circuit 6 supplies water from the washing water tank 5 to the planting devices 4. The washing water circuit 6 comprises a first supply component 60, a washing water line 66, and a first on/off valve 67. The washing water line 66 connects the washing water tank 5 and the three planting devices 4. The first on/off valve 67 is provided to the washing water line 66. The washing water line 66 branches to the three planting devices 4 downstream from the first on/off valve 67. The first supply component 60 supplies water from the cleaning water tank 5 to the first on/off valve 67.

The first supply component 60 includes an electric motor 61, a first pump 62, a circuit power switch 63, a pressure sensing switch 64, and an accumulator 65.

The pressure sensing switch 64 is turned on when it senses that the accumulator 65 has reached a specific pressure or less. The electric motor 61 is driven or stopped by switching the pressure sensing switch 64 on or off. The circuit power switch 63 turns the circuit between the pressure sensing switch 64 and the electric motor 61 on and off. When the planting devices 4 operate, the circuit power switch 63 is always on, and the pressure sensing switch 64 and the electric motor 61 are electrically connected. The first pump 62 operates under drive by the electric motor 61, and supplies water from the washing water tank 5 to the accumulator 65.

The washing water line 66 has a first washing water line portion 66a, a second washing water line portion 66b, and a third washing water line portion 66c. The first washing water line portion 66a connects the washing water tank 5, the first pump 62, and the accumulator 65, in that order. The second washing water line portion 66b connects the three-planting devices 4 between the accumulator 65 and the first pump 62 of the first washing water line portion 66a. The first on/off valve 67 is disposed in the second washing water line portion 66b, and the second washing water line portion 66b branches in three downstream from the first on/off valve 67 and is connected to each of the planting devices 4. The third washing water line portion 66c connects from the point on the first cleansing water line portion 66a where the second washing water line portion 66b is connected, up to the pressure sensing switch 64.

The accumulator 65, the first pump 62, the electric motor 61, and so forth are disposed near the washing water tank 5. As shown in FIGS. 2 and 3, the second washing water line portion 66b of the washing water line 66 is disposed from the washing water tank 5 disposed at the rear, through the right side face of the vehicle main unit 2, to the planting devices 4 at the front.

When it is sensed by the pressure sensing switch 64 that the pressure of the accumulator 65 has dropped to below a specific pressure while the circuit power switch 63 is on, the electric motor 61 is driven so that water is supplied by the first pump 62 from the washing water tank 5 to the accumulator 65. When water is supplied until a specific pressure is exceeded, the pressure sensing switch 64 is turned off and the electric motor 61 stops.

In this state, when the first on/off valve 67 is opened by the controller 10, water is supplied from the first on/off valve 67 toward the three planting devices 4 under the pressure of the accumulator 65.

The irrigation water tank 8 is fixed to the trailer 7 towed by the vehicle main unit 2, as shown in FIG. 1. That is, the irrigation water tank 8 is disposed to the rear of the vehicle main unit 2. Irrigation water is often used in large quantities, so the irrigation water tank 8 is larger than the washing water tank 5, and can hold more water than the washing water tank 5. The irrigation water can also be water from a river, swamp, etc., or can be gel water or another such material that is able to retain water.

The trailer 7 is towed by the vehicle main unit 2. A hitch 25 is provided on the rear side of the vehicle main unit 2, and the trailer 7 can be detachably linked to this hitch 25.

As shown in FIG. 4, the irrigation water circuit 9 comprises a second supply component 90, an irrigation water line 95, and a second on/off valve 96. The irrigation water line 95 connects the irrigation water tank 8 and the three planting devices 4. The second on/off valve 96 is provided to the irrigation water line 95. The irrigation water line 95 branches off to the three planting devices 4 downstream from the second on/off valve 96. The second supply component 90 supplies water from the irrigation water tank 8 to the second on/off valve 96.

The second supply component 90 has a hydraulic motor 91, a second pump 92, a variable throttle valve 93, and a variable throttle valve 94. The hydraulic motor 91 is driven by hydraulic pressure from the vehicle main unit 2 to drive the second pump 92. The second pump 92 supplies water from the irrigation water tank 8 to each of the planting devices 4. The irrigation water line 95 has a first irrigation water line portion 95a and a second irrigation water line portion 95b. The first irrigation water line portion 95a connects the irrigation water tank the second pump 92, the variable throttle valve 93, and the second on/off valve 96, in that order, and then branches off to connect with the three planting devices 4. The second irrigation water line portion 95b branches off from between the second pump 92 and the variable throttle valve 93 of the first irrigation water line portion 95a and is connected to the irrigation water tank 8. The variable throttle valve 94 is provided to the second irrigation water line portion 95b. When the second on/off valve 96 is open, the water supplied from the second pump 92 is distributed according to the throttle settings of the variable throttle valve 93 and the variable throttle valve 94.

During operation of the planting devices 4, the hydraulic motor 91 is constantly turned by hydraulic fluid from a main valve 13 (discussed below). When the second on/off valve 96 is closed, water from the irrigation water tank 8 goes back through the second irrigation water line portion 95b to the irrigation water tank 8. Then, when the second on/off valve 96 is opened, the water in the irrigation water tank 8 flows through the variable throttle valve 93 to the planting devices 4, for as long as the second on/off valve 96 is open, according to the pressure ratio set by the variable throttle valve 93 and the variable throttle valve 94. Since the hydraulic motor 91 is constantly driven, the downstream side of the first irrigation water line portion 95a is kept pressurized even when the second on/off valve 96 is closed. Therefore, water can be discharged as the second on/off valve 96 is opened, with little time lag.

The hydraulic motor 91, the second pump 92, the variable throttle valves 93 and 94, and the second irrigation water line portion 95b are attached to the irrigation water tank 8 as shown in FIG. 1. As shown in FIGS. 2 and 3, the first irrigation water line portion 95a is disposed from the irrigation water tank 8 at the rear, through the right side face of the vehicle main unit 2, to the planting devices 4 at the front.

As shown in FIG. 4, the controller 10 controls the main valve 13, the first on/off valve 67, and the second on/off valve 96. The main valve 13 has a plurality of valves, and hydraulic pressure is supplied to the main valve 13 by the hydraulic pump 12 driven by the engine 11. The controller 10 controls the main valve 13 so that the various components of the tree planting machine 1 are driven. For example, the vertically pivoting cylinder 43 and the horizontally pivoting cylinder 44 are operated to adjust the position of the planting devices 4. The controller 10 also controls the main valve 13 so that hydraulic pressure is supplied through the two hydraulic lines 14 shown in FIG. 3 to the hydraulic motor 91 installed in the irrigation water tank 8 on the trailer 7. As the hydraulic motor 91 rotates, the second pump 92 is driven and the irrigation water is drawn out of the irrigation water tank 8. The hydraulic motor 91 is operated by hydraulic pressure from the main valve 13.

The controller 10 also controls the opening and closing of the first on/off valve 67 and the second on/off valve 96 according to the operation of the planting devices 4, and supplies washing water and irrigation water to the planting devices 4.

The operation of the tree planting machine 1 in an embodiment of the present invention will now be described.

The tree planting machine 1 in this embodiment plants seedlings at a predetermined spacing in three rows. The controller 10 drives the vertically pivoting cylinder 43 to adjust the position of the planting devices 4 while driving the horizontally pivoting cylinder 44 and adjusting the position of the planting devices 4 so that planting is carried out along the preset rows.

The controller 10 drives the second pump 92 by controlling the main valve 13, and also puts the second on/off valve 96 in its open state at the point when the seedlings are planted, and supplies irrigation water from the irrigation water tank 8 to the ground via the planting devices 4.

After the seedlings have been planted, the controller 10 opens the first on/off valve 67, whereupon the washing water is pushed out by the pressure of the accumulator 65 and is supplied to the pipe-like members inside the planting devices 4.

The amounts of water for irrigation and washing can be adjusted by controlling how long the first on/off valve 67 and the second on/off valve 96 are left open by the controller 10.

The tree planting machine 1 (an example of a work vehicle) in this embodiment comprises the vehicle main unit 2, the washing water tank 5 (an example of a first tank), the planting devices 4, the washing water circuit 6 (an example of a first water circuit), and the controller 10. The washing water tank 5 is attached to the vehicle main unit 2 and holds water. The planting devices 4 are disposed on the vehicle main unit 2. The washing water circuit 6 connects the washing water tank 5 and the planting devices 4. The controller 10 controls the washing water circuit 6 so as to supply the water in the washing water tank 5 to the planting devices 4.

This eliminates the need to carry around water separately, such as washing water, and since water is supplied automatically, a worker does not have to do the jobs of carrying and supplying water.

With the tree planting machine 1 (an example of a work vehicle) in this embodiment, the washing water tank 5 is attached to the rear of the vehicle main unit 2. The planting devices 4 are disposed on the front side of the vehicle main unit 2.

Consequently, it is easy for a worker driving the vehicle main unit 2 to check the planting state of the seedlings by the planting devices 4.

The tree planting machine 1 (an example of a work vehicle) in this embodiment comprises the trailer 7, the irrigation water tank 8 (an example of a second tank), and the irrigation water circuit 9 (an example of a second water circuit). The trailer 7 is towed by the vehicle main unit 2. The irrigation water tank 8 is mounted on the trailer 7, and is larger than the washing water tank 5 (an example of a first tank) and holds water. The irrigation water circuit 9 connects the irrigation water tank 8 and the planting devices 4. The controller 10 controls the irrigation water circuit 9 so as to supply the water in the irrigation water tank 8 to the planting devices 4.

Providing the tanks separately from the vehicle main unit 2 as described above makes it possible to accommodate situations in which a large amount of irrigation water is required.

Also, the irrigation water does not need to be clean water, such as washing water, and in some cases gel water, which has high water retention, may be used, so various kinds of water are used. Therefore, providing the irrigation water tank 8 separately from the vehicle main unit 2 makes it easier to select tanks and lines according to the water to be used by the user.

With the tree planting machine 1 (an example of a work vehicle) in this embodiment, the water in the washing water tank 5 (an example of a first tank) is used for washing the planting devices 4, and the water in the irrigation water tank 8 (an example of a second tank) is used as irrigation water.

This allows both the washing water for the planting devices 4 and the irrigation water to be supplied automatically to the planting devices 4.

With the tree planting machine 1 (an example of a work vehicle) in this embodiment, the washing water circuit 6 (an example of a first water circuit) has the washing water line 66 (an example of a first line), the first on/off valve 67 (an example of a first valve), and the first supply component 60. The washing water line 66 connects the washing water tank 5 (an example of a first tank) and the planting devices 4. The first on/off valve 67 is provided to the washing water line 66. The first supply component 60 supplies the water in the washing water tank 5 to the first on/off valve 67 via the washing water line 66. The controller 10 controls the amount and timing at which water is supplied to the planting devices 4 by controlling the first on/off valve 67.

In this way, the amount of water and the timing at which the water is supplied from the washing water tank 5 can be controlled by controlling the opening and closing of the first on/off valve 67.

With the tree planting machine 1 (an example of a work vehicle) in this embodiment, the irrigation water circuit 9 (an example of a second water circuit) has the irrigation water line 95 (an example of a second line), the second on/off valve 96 (an example of a second valve), and the second supply component 90. The irrigation water line 95 connects the irrigation water tank 8 and the planting devices 4. The second on/off valve 96 is provided to the irrigation water line 95. The second supply component 90 supplies the water in the irrigation water tank 8 to the second on/off valve 96 via the irrigation water line 95. The controller 10 controls the amount and timing at which water is supplied to the planting devices 4 by controlling the opening and closing of the second on/off valve 96.

In this way, the amount of water and the timing at which the water is supplied from the irrigation water tank 8 can be controlled by controlling the opening and closing of the second on/off valve 96.

With the tree planting machine 1 (an example of a work vehicle) in this embodiment, the first supply component 60 has the accumulator 65, the pressure sensing switch 64 (an example of a sensor), and the first pump 62. The accumulator 65 is connected to the washing water line 66 and is able to supply water to the first on/off valve 67. The pressure sensing switch 64 senses the pressure of the accumulator 65. The first pump 62 is provided to the washing water line 66. When it is sensed by the pressure sensing switch 64 that the pressure of the accumulator 65 has reached a specific value or less, water is supplied from the washing water tank 5 to the accumulator 65.

Consequently, water is supplied from the accumulator 65 to the first on/off valve 67, so the first pump 62 need be driven only when the pressure of the accumulator 65 has reached a specific value or less, which means that less energy is consumed.

With the tree planting machine 1 (an example of a work vehicle) in this embodiment, the second supply component 90 has the second pump 92 and the variable throttle valve 93 (an example of a throttle valve). The second pump 92 is provided to the irrigation water line 95 and supplies water from the irrigation water tank 8 to the second on/off valve 96. The variable throttle valve 93 is provided between the second pump 92 and the second on/off valve 96 of the irrigation water line 95. The irrigation water circuit 9 has the second irrigation water line portion 95*b* (an example of a line portion). The second irrigation water line portion 95*b* connects the irrigation water tank 8 between the second pump 92 and the variable throttle valve 93.

Consequently, irrigation water can be supplied from the irrigation water tank 8 to the second on/off valve 96, and irrigation water can be supplied from the second on/off valve to the three planting devices 4.

An embodiment of the present invention is described above, but the present invention is not limited to or by the above embodiment, and various modifications are possible without departing from the gist of the invention.

The irrigation water tank 8 is provided to the tree planting machine 1 in the above embodiment, but sometimes it is not necessary to supply irrigation water, depending on the planting environment, season, etc., so the irrigation water tank 8 may not be provided. In this case, the trailer 7 may not be provided, either.

The accumulator 65 is provided to the washing water circuit 6 in the above embodiment but the accumulator 65 may not be provided, and the washing water circuit 6 may be configured like the irrigation water circuit 9 having a variable throttle valve. However, in this case the first pump 62 will need to be rotating constantly, which wastes a great deal of energy.

In the above embodiment, an accumulator may be provided on the irrigation water circuit 9 side so that the irrigation water circuit 9 is configured like the washing water circuit 6.

In the above embodiment, the irrigation water tank 8 is provided separately from the vehicle main unit 2 in order to afford greater latitude in water selection on the worker side, but the irrigation water tank 8 may be fixed to the vehicle main unit 2.

In the above embodiment, the washing water circuit 6 is provided with the electric motor 61, but a hydraulic motor may be used instead. However, it is preferable to use an electric motor because the amount of washing water supplied is smaller and the drive time of the motor is shorter.

In the above embodiment, the hydraulic motor 91 is provided to the irrigation water circuit 9, but an electric motor may be used instead. However, it is preferable to use a hydraulic motor because the amount of irrigation water supplied is larger and the drive time of the motor is longer.

In the above embodiment, the variable throttle valve 94 is provided to the second irrigation water line portion 95*b,* but a relief valve may be provided instead of a variable throttle valve.

Also, in the above embodiment, the variable throttle valves 93 and 94 are provided to the first irrigation water line portion 95*a* and the second irrigation water line portion 95*b*, but the variable throttle valve 94 of the second irrigation water line portion 95*b* may not be provided.

In the above embodiment, the accumulator 65 and the first on/off valve 67 are provided to the washing water circuit 6, but the accumulator 65 and the first on/off valve 67 may not be provided, and the electric motor 61 may be driven only when washing water is required.

In the above embodiment the first on/off valve 67 is provided on the upstream side of the branching point where the second washing water line portion 66b branches into three lines, but is may be provided to each of the three branched lines.

Also, in the above embodiment, the second on-off valve 96 is provided on the upstream side of the branching point where the first irrigation water line portion 95a branches into three lines, but it may be provided to each of the three branched lines.

In the above embodiment, three of the planting devices 4 are provided, but the number of planting devices 4 is not limited to three, and just one or two planting devices 4 may be provided, or four or more planting devices 4 may be provided to the beam 3.

In the above embodiment, the beam 3 is provided on the front side of the vehicle main unit 2, but the beam 3 may instead be provided on the rear side of the vehicle main unit 2.

The tree planting machine of the present invention has the effect of making it possible to provide a work vehicle with which water can be automatically supplied for use in forestation, and is useful when forestation is performed over large tracts of land, etc.

What is claimed is:

1. A work vehicle, comprising:
a vehicle main unit;
a first tank attached to the vehicle main unit, the first tank being configured to hold water;
a planting device disposed on the vehicle main unit;
a first water circuit connecting the first tank and the planting device;
a controller configured to control the first water circuit so as to supply water from the first tank to the planting device;
a trailer towed by the vehicle main unit;
a second tank mounted on the trailer, the second tank being larger than the first tank, the second tank being configured to hold water; and
a second water circuit connecting the second tank and the planting device;
the second water circuit not being in fluid communication with the first water circuit; and
the controller being configured to control the second water circuit so as to supply water from the second tank to the planting device.

2. The work vehicle according to claim 1, wherein
the first tank is attached in back of the vehicle main unit, and
the planting device is disposed in front of the vehicle main unit.

3. The work vehicle according to claim 1, wherein
water in the first tank is used as washing water for the planting device, and
water in the second tank is used as irrigation water.

4. The work vehicle according to claim 1, wherein
the first water circuit includes
a first line connecting the first tank and the planting device;
a first valve provided to the first line; and
a first supply component configured to supply water from the first tank to the first valve via the first line,
the controller is configured to control an amount and a timing of water supplied to the planting device by controlling an opening and a closing of the first valve.

5. The work vehicle according to claim 4, wherein
the first supply component includes
an accumulator connected to the first line, the accumulator being able to supply water to the first valve;
a sensor for sensing a pressure of the accumulator; and
a first pump provided to the first line, the first pump being configured to supply water from the first tank to the accumulator when it is detected by the sensor that the pressure of the accumulator has reached a specific value or less.

6. The work vehicle according to claim 1, wherein
the second water circuit includes
a second line connecting the second tank and the planting device;
a second valve provided to the second line; and
a second supply component configured to supply water from the second tank to the second valve via the second line,
the controller is configured to control an amount and a timing of water supplied to the planting device by controlling an opening and a closing of the second valve.

7. The work vehicle according to claim 6, wherein
the second supply component includes
a second pump provided to the second line, the second pump being configured to supply water from the second tank to the second valve; and
a throttle valve provided between the second valve and the second pump of the second line,
the second line has a line component connecting the second tank between the second pump and the throttle valve.

* * * * *